(12) United States Patent
Westgarth

(10) Patent No.: US 9,854,783 B2
(45) Date of Patent: Jan. 2, 2018

(54) COOLING MAT

(71) Applicant: John Westgarth, San Marcos, CA (US)

(72) Inventor: John Westgarth, San Marcos, CA (US)

( * ) Notice: Subject to any disclaimer, the term of this patent is extended or adjusted under 35 U.S.C. 154(b) by 91 days.

(21) Appl. No.: 14/668,496

(22) Filed: Mar. 25, 2015

(65) Prior Publication Data

US 2016/0278339 A1    Sep. 29, 2016

(51) Int. Cl.
*A01K 1/015* (2006.01)
*A01K 1/035* (2006.01)

(52) U.S. Cl.
CPC .......... *A01K 1/0158* (2013.01); *A01K 1/0157* (2013.01); *A01K 1/0353* (2013.01)

(58) Field of Classification Search
CPC .... A01K 1/0158; A01K 1/0353; A01K 1/015; A01K 1/0157; A47C 27/08; A47C 27/10; A47C 27/085
USPC .................................................. 119/28.5, 526
See application file for complete search history.

(56) References Cited

U.S. PATENT DOCUMENTS

| | | | |
|---|---|---|---|
| 4,064,835 A | 12/1977 | Rabenbauer | |
| 5,632,051 A * | 5/1997 | Stanley | A01K 1/0157 5/421 |
| 5,653,195 A * | 8/1997 | Young | A01K 1/0157 119/28.5 |
| 6,708,646 B1 | 3/2004 | Wang | |
| 8,720,218 B2 | 5/2014 | Prendergast | |
| 2006/0179577 A1* | 8/2006 | Chaffee | A47C 4/54 5/706 |
| 2008/0022714 A1* | 1/2008 | Keller | A01K 1/0236 62/459 |
| 2008/0295775 A1* | 12/2008 | Arvanites | A01K 1/0353 119/28.5 |
| 2009/0084320 A1* | 4/2009 | Reusche | A01K 1/0353 119/28.5 |
| 2010/0009128 A1* | 1/2010 | Fan | A47C 27/085 428/188 |
| 2011/0139406 A1* | 6/2011 | Rizzo | A01K 1/0157 165/104.19 |
| 2012/0266822 A1* | 10/2012 | Stevens | A01K 1/0157 119/28.5 |
| 2012/0291711 A1* | 11/2012 | Baker | A01K 1/0353 119/28.5 |
| 2015/0059650 A1* | 3/2015 | Kent | A01K 1/0353 119/28.5 |
| 2016/0057971 A1* | 3/2016 | Jenkins | A01K 1/0157 119/28.5 |

* cited by examiner

*Primary Examiner* — Trinh Nguyen
(74) *Attorney, Agent, or Firm* — Florek & Endres PLLC

(57) ABSTRACT

A cooling mat for cooling an object comprising a first layer bonded to a second layer to define an interior space, a cooling composition within the interior space and a fill spout allowing the addition of water to the interior space. A support opening for hanging the mat may be included.

13 Claims, 3 Drawing Sheets

COOLING MAT

FIELD OF THE INVENTION

The present invention relates to a cooling mat for pets.

BACKGROUND OF THE INVENTION

There are a number of methods used to cool pets, such as cats and dogs. A common method involves pouring, spraying, or immersing the pet in cool water. However, this method may be time-consuming, labor intensive and messy since the pet will be wet and will need to be dried before leaving a bathing area or reentering a home. Another method is to wrap the pet in a cool water-soaked towel or allow the pet to lie on such a towel. However, this method may also be time-consuming, labor intensive and messy since the pet will also be wet. Further, the towel may need to be re-soaked with cool water several times to achieve optimal cooling as well as to account for evaporation and absorption of the cool water.

Another commonly used method is the use of electronic devices such as electric fans, air conditioning and electric cooling pads/beds. However, these devices require a connection to a power source, can be expensive to operate and are typically not portable.

Prior art patents describe cooling apparatus for pets in the form of pet beds. For example, U.S. Pat. No. 4,064,835 describes an air-conditioned pet bed that provides for cooling means in the form of re-usable, pre-frozen, chemical ice-packs adapted to fit within an insulated portion of the pet bed.

U.S. Pat. No. 6,708,646 describes a cooling pad for pets comprising a base and a cooling pad body held on the base. The cooling pad body is mounted onto the base such that the cooling pad body is spaced from the ground surface to facilitate heat dissipation.

U.S. Pat. No. 8,720,218 describes a cooling platform comprising a temperature regulation layer, a support layer, a channeled covering layer and a pressure activated recharging cooling composition within the temperature regulation layer which is endothermically activated and endothermically deactivated upon the application and release of pressure, respectively.

Although the prior art includes various portable cooling mats, mattresses and platforms, the present invention provides numerous benefits over the prior art teachings as will be described below.

It is therefore an object of the present invention to provide a cooling mat for pets that is portable and lightweight for shipping as well as easily activated and reusable.

SUMMARY OF THE INVENTION

The present invention is a cooling mat for cooling an object, the mat comprising a first layer bonded to a second layer to define an interior space therebetween, a liquid activated cooling composition within the interior space and a fill spout extending from the exterior of the mat to the interior space allowing the addition of liquid to the interior space. A support opening capable of receiving a support member for hanging the mat with the fill spout at an upper end of the mat when hung is also preferred.

The first layer and second layer can be made of any suitable durable material that is known in the art. Preferably, a nylon coated polyvinylchloride (PVC) material may be used. The first and second layers may be bonded to each other by any means known in the art to create a watertight seal, and preferably by radiofrequency (RF) welding.

The liquid activated cooling composition may be any liquid activated cooling composition used for controlling the temperature of products including, but not limited to, gels, phase change materials, alcohol/water mixtures, or the like that are known in the art to serve as a cooling medium. Preferably, a liquid activated cooling composition comprising a super absorbent polymer in the form of powders, granules, beads, microcapsules, pellet and combinations thereof, may be used where activation of the liquid activated cooling composition forms a gel composition upon the absorption of a liquid.

The fill spout may be sealed by any means known in the art, including re-sealable or permanent means, and is preferably self-sealing. When using a self-sealing fill spout, a self-adhering plastic material is preferably used with the edges of the fill spout bonded to each other by any means known in the art, and preferably by radiofrequency (RF) welding.

The support opening, when used, may be of any shape known in the art that may be used to receive a support member for hanging the mat. The perimeter of the support opening may be sealed by any means known in the art, and preferably by radiofrequency (RF) welding.

The cooling mat of the present invention provides for comfortable cooling of an object once the liquid activated cooling composition is activated to a gel composition. The gel composition automatically recharges following use with the removal of heat from the cooling mat to the ambient atmosphere and makes the cooling mat renewable for an object without the need for a refrigeration source, as is necessary for prior art cooling gel pads. Notwithstanding, the present invention may be chilled or refrigerated to provide for more rapid cooling of the gel composition.

In addition, the present invention provides for economical manufacture and shipment of a cooling mat where the costs of shipping the added weight of a mat with a cooling gel composition may be avoided. In this regard, the present invention allows the user to activate the liquid activated cooling composition in the mat with the addition of a suitable liquid, preferably water, through a self-sealing fill spout. The use of self-sealing spout is considered to be advantageous to screw-on caps, ties, tape, straps, glue, or the like that are known in the art, which may be improperly closed by the user and subject to failure and leakage.

The support opening, being a hole, aperture, handle or like structure, is designed to fit over a suitable support, such as a door knob, hanger, hook or the like, to stabilize the mat while the user is adding the activation liquid through the fill spout, or to provide an additional means for storage when the mat is not in use.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION

The present invention is now described with reference to figures which indicate identical or functionally similar elements. While specific configurations and arrangements are discussed, it should be understood that this is done for illustrative purposes only. A person skilled in the relevant art will recognize that other configurations and arrangements can be used without departing form the spirit and scope of the invention.

The invention herein described is multilayered, comprising two or more layers. In an embodiment of the invention, one layer is bonded to the next layer or to the outer layers in a suitable fashion. For the purpose of this disclosure, the term "bonded" refers to a continuous connection, as well as the joining, adhering, affixing, connecting, attaching, sewing or the like, through chemical, mechanical, electrical avenues or other suitable alternative methods, of at least two layers of a cooling mat, such that the layers remain bonded to create a watertight seal during normal use conditions of the cooling mat. Although the cooling mat of the present invention can be comprised of any number of layers, having any number of functions, such as support, comfort, or heat dissipation layers, the present invention will be described herein in its most simple two layer embodiment.

Figure 1:
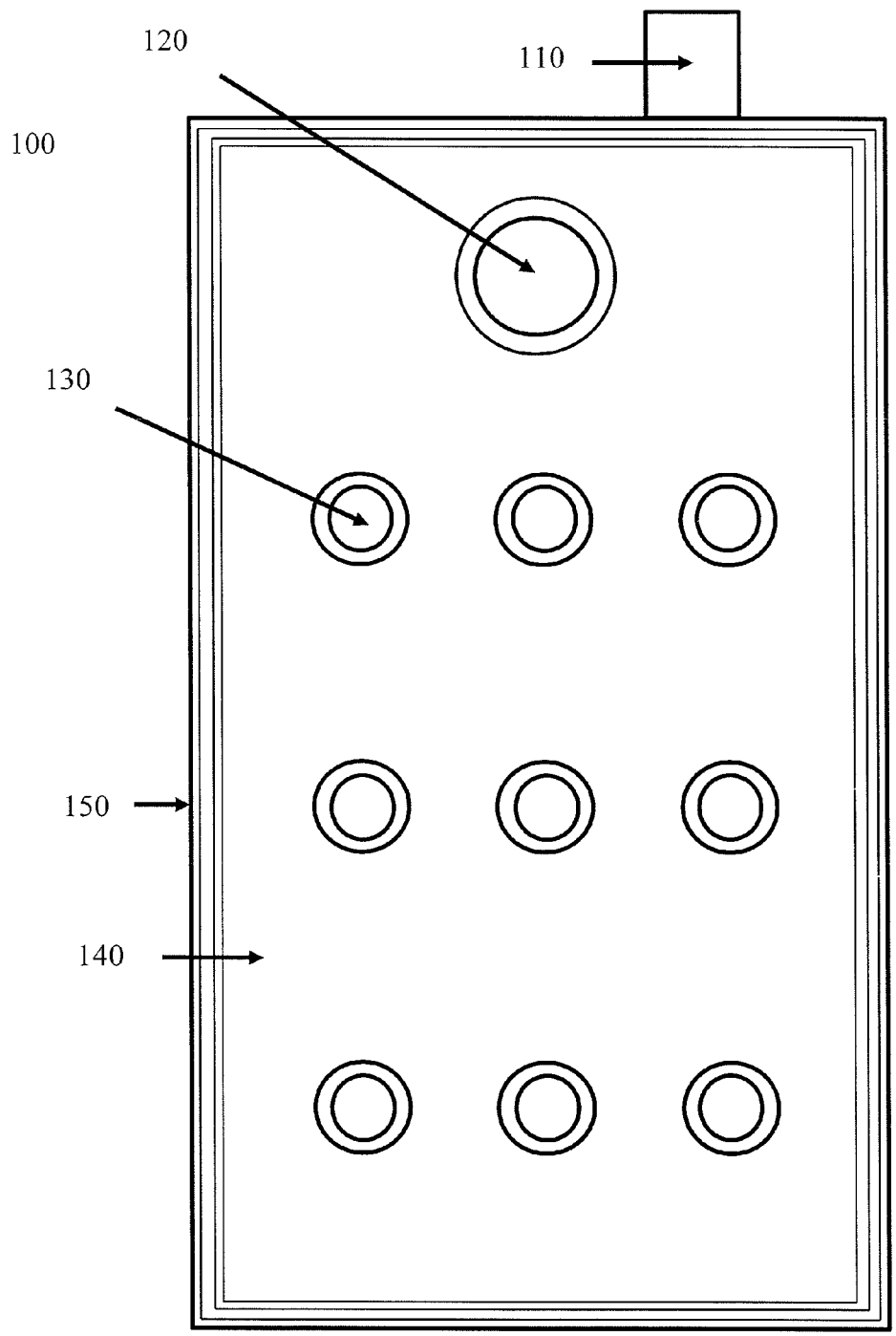
FIG. 1 illustrates a top plan view of an embodiment of the present invention.
Figure 4:
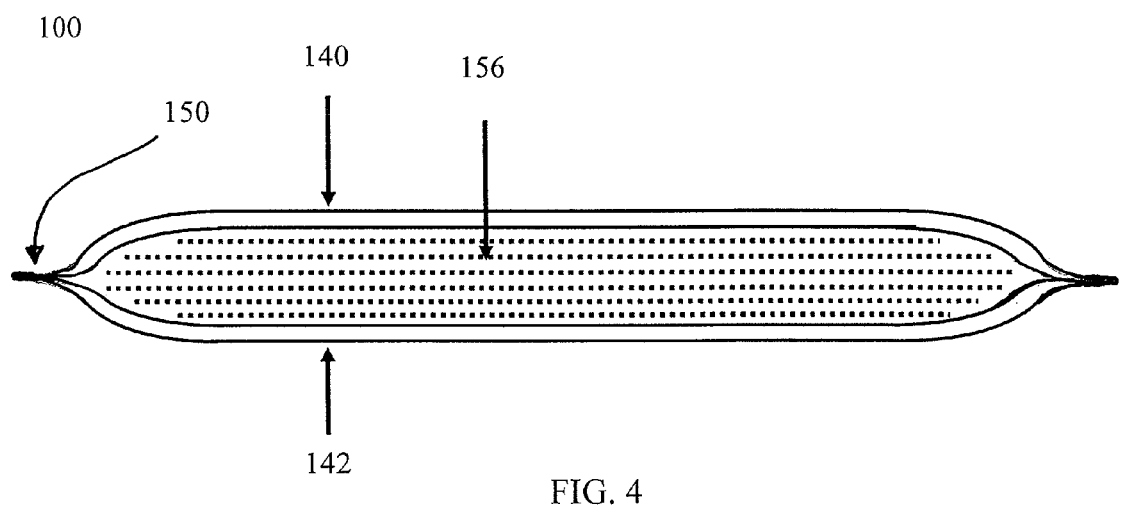
FIG. 4 illustrates a detailed cross-sectional elevation of the present invention.

FIG. 1 illustrates a cooling mat 100. The cooling mat 100 comprises a first layer 140 and a second layer 142, as illustrated in FIG. 4. The first and second layers 140 and 142 may comprise any suitable durable material known in the art including, but not limited to, plastic, nylon or cloth netting, or a micro-fiber material with a waterproof layer. In a preferred embodiment, the first and second layers 140 and 142 comprise a nylon coated polyvinylchloride (PVC) material.

The first layer 140 is bonded to the second layer 142 at or near at least a portion of the perimeter 150 of the cooling mat 100, forming a defined, watertight interior space to retain a liquid activated cooling composition, such as cooling composition 156 in both its non-activated and activated states. The first and second layers 140 and 142 are also preferably bonded at intermittent locations throughout the cooling mat 100, more preferably with one or more intermediate bonds, and most preferably a plurality of spaced circular welds 130. The first and second layers 140 and 142 may be bonded together by any suitable means known in the art including, but not limited to, chemical, mechanical, electrical or other suitable alternative means.

In a preferred embodiment, the first and second layers 140 and 142 are bonded together about the entire perimeter 150, exclusive of the fill spout 110, and at the circular welds 130 throughout the cooling mat 100, by welding. In a more preferred embodiment, the bonding is achieved with radiofrequency welding and is preferably double welded to provide a more secure attachment of the layers and minimize the risk of failure.

The circular welds 130 are adapted to provide intermediate bonds between the first and second layers 140 and 142 to reduce slippage when the cooling mat 100 is stepped on. Additionally, the circular welds 130 help maintain the shape of the cooling mat 100 and allow the gel composition of the activated cooling composition 156 to move around the mat to conform to the body of the object being cooled.

Figure 3:
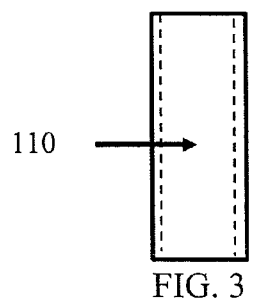
FIG. 3 illustrates a cross-sectional top plan view of a fill spout for use with the present invention.
Figure 3A:
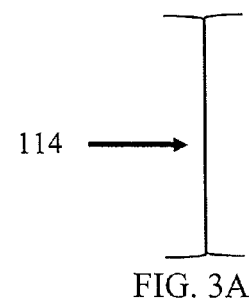
FIG. 3A illustrates a cross-sectional side view of the fill spout of FIG. 3 in a sealed state.

The cooling mat 100 comprises a fill spout 110, preferably extending from the exterior of the mat at the perimeter 150 to the interior space, adapted to introduce a predetermined amount of suitable liquid to the interior space for activation of the cooling composition 156. FIG. 3 illustrates an embodiment of the fill spout 110 of the present invention with FIG. 3A illustrating the fill spout 110 of the present invention in a sealed state. The edges of the fill spout 110 are bonded together by any suitable means known in the art including, but not limited to, chemical, mechanical, electrical or other suitable alternative means. In a preferred embodiment, the edges of the fill spout 110 are bonded together by welding. In a more preferred embodiment, the bonding is achieved with radiofrequency welding and is preferably double welded to provide a more secure attachment of the edges and minimize the risk of failure.

The fill spout 110 may be sealed, either temporarily or permanently, by any means known in the art including, but not limited to screw-on caps, ties, tape, straps, glue or the like. Preferably, however, the fill spout 110 is formed of a material that allows the addition of liquid to pass through the fill spout 110 to the interior space between the first and second layers 140 and 142, then self-seals as a closed cavity 114 to trap liquid in the cooling mat 100 and to prevent the escape of liquid and gel composition of the activated cooling composition 156, as illustrated in FIG. 3A. The end of the fill spout 110 is sufficiently long, extending down into the cooling mat 100, to avoid the creation of an edge for any liquid to push against and possibly leak.

The preferred cooling mat 100 also comprises a support opening 120 to allow the mat to be hung on a complementary external support, such as a handle, doorknob, hook, or the like. The support opening 120 may be any shape known in the art that may be used to receive a support member for hanging the cooling mat 100. The support opening 120 provides a convenient way to hang the cooling mat 100 over a suitable support, such as a door knob, to stabilize the cooling mat 100 while the user is adding water through the fill spout 110 or to provide an additional means for storage when not in use.

In a preferred embodiment, the support opening 120 is formed through the first layer 140 and the second layer 142. The perimeter of the support opening 120 is sealed by any suitable means known in the art including but not limited to, chemical, mechanical, electrical or other suitable alternative means. In a preferred embodiment, the perimeter of the support opening 120 is sealed by welding. In a more preferred embodiment, the sealing is achieved with radiofrequency welding and is preferably doubled welded to provide a more secure attachment of the layers and minimize the risk of sealing failure.

Figure 2:
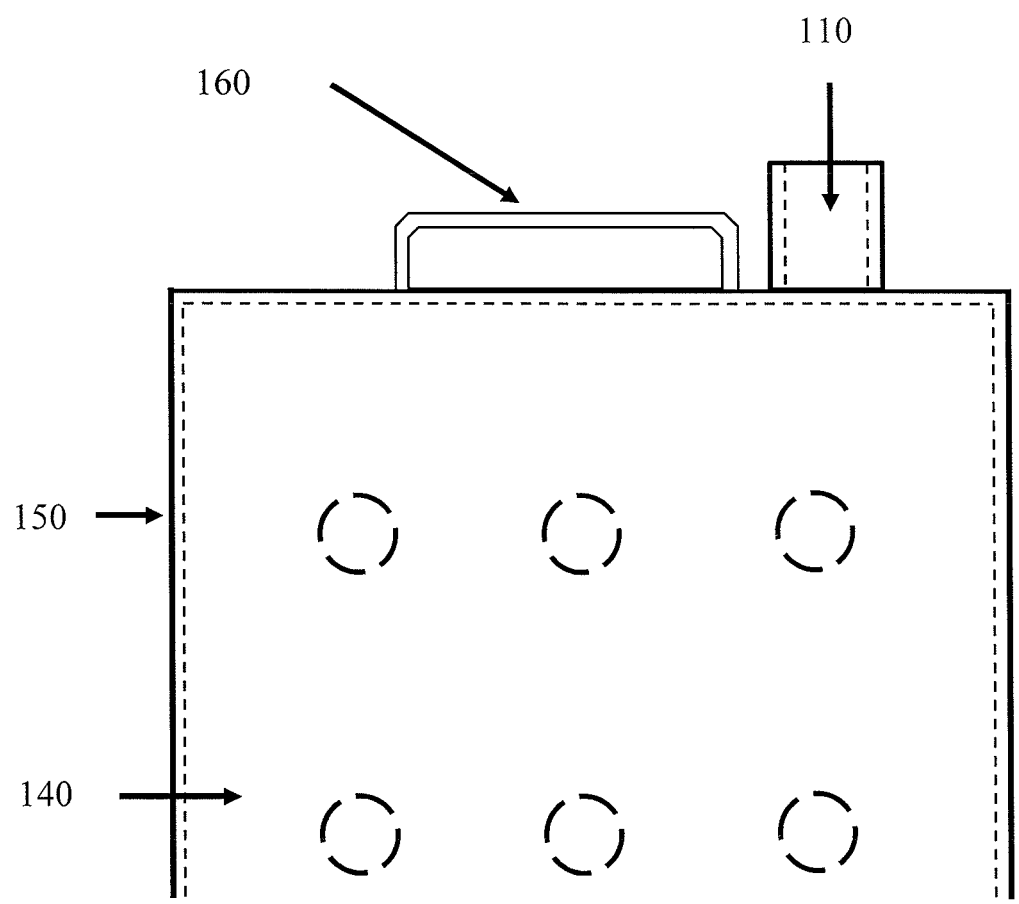
FIG. 2 illustrates a cross-sectional top plan view of another embodiment of the present invention.

FIG. 2 illustrates an alternate embodiment of a support opening 160 that extends from the exterior of the perimeter 150, such as in the form of a handle.

FIG. 4 illustrates a detailed cross-sectional elevation of the cooling mat 100. The interior space between the first layer 140 and the second layer 142 is adapted to hold a cooling composition 156, which, when activated, forms a gel composition that cools to an ambient temperature lower than the temperature of an object to be cooled on the cooling mat 100. The cooling composition 156 may be any liquid activated cooling composition used for controlling the temperature of products such as a gel, a single phase change material (PCM), or other compositions, such as alcohol/water mixture, etc., that are known in the art to serve as a cooling medium.

The cooling composition 156 preferred herein comprises a liquid activated super absorbent polymer in a form that includes, but is not limited to, powder, granule, bead, microcapsule and/or pellet particles. In a most preferred embodiment, the cooling composition 156 comprises liquid activated super absorbent polymer beads. The cooling composition 156 can be user activated with the introduction of sufficient amount of suitable liquid through the fill spout 110. The super absorbent polymer beads preferably absorb all free flowing liquid throughout interior space of the cooling mat 100, trapping the liquid in a gel state that discourages leaking. The liquid can be any suitable liquid capable of activating the cooling composition 156, and is preferably water.

The interior space of the cooling mat 100 is adapted to hold a small amount of gel relative to the volume of interior space, to render the cooling mat 100 capable of shifting and conforming to the shape of the object lying on the cooling mat 100 without causing a level of pressure that would force any liquid out of the cooling mat 100.

As set forth above, the preferred first layer 140 and the second layer 142 of the cooling mat 100 may further comprise a nylon coated polyvinylchloride (PVC) material. The material may further be adapted with complementary features that include, but are not limited to, antibacterial, stain resistant, chew resistant, and/or anti-flea properties.

The cooling mat 100 is adapted to provide cooling to a wide variety of objects. As used herein, the term "object" can mean a variety of things including, but not limited to, domestic animals, such as cats and dogs. The use of the cooling mat 100 can extend to human use in vehicles or similar circumstances calling for such cooling. Generally, the cooling mat 100 can be used for anything that needs or requires occasional cooling.

The present invention provides for comfortable cooling of an object once the cooling composition 156 is activated by the addition of liquid to form a gel composition. Once activated, the duration of cooling provided from the cooling mat 100 depends on the ambient temperature and the temperature of the object in contact with the cooling mat 100. The gel composition automatically recharges following use with the removal of the heated object from contact with the cooling mat 100, through heat transfer with the ambient atmosphere and without the need for additional treatments or extraneous equipment. However, the cooling mat 100 may be refrigerated for a short period of time and re-applied as desired to provide for more rapid cooling of the gel composition.

The present invention also provides a method of manufacturing a cooling mat for cooling an object, the method comprising the steps of: (i) arranging a first layer and a second layer; (ii) permanently affixing the first layer to the second layer around at least a portion of the perimeter, forming an interior space therebetween with an opening to the interior space; (iii) providing a fill spout extending from the exterior of the mat to the interior space; and (iv) adding a liquid activated cooling composition within the interior space.

The preferred method further includes the step of introducing a suitable liquid to the interior space through the fill spout, for absorption by the liquid activated cooling composition, and sealing of the fill spout, preferably by self-sealing.

The present invention provides a method of manufacturing a cooling mat wherein the costs of activating a cooling composition and shipping a cooling mat with the added weight of a gel composition may be avoided. In this regard, the additional step of introducing a suitable liquid to the interior space to activate the cooling composition is anticipated to be a user performed step.

While certain exemplary embodiments have been described and shown in the accompanying drawings, it is to be understood that such embodiments are merely illustrative and not restrictive of the current invention, and that this invention is not restricted to the specific constructions and arrangements shown and described since modification can occur to those ordinarily skilled in the art.

Variations, modifications and alterations to the above detailed description will be apparent to those skilled in the art. All such variations, modifications and/or alternatives are intended to fall within the scope of the present invention.

All documents, patents and other literature referred to herein are incorporated by reference in their entirety.

The term "comprising" as used in the following claims is an open-ended transitional term that is intended to include additional elements not specifically recited in the claims.

It should be noted that it is envisioned that any feature or element that is positively identified in this document may also be specifically excluded as a feature or element of an embodiment of the present invention.

I claim:

1. A cooling mat for cooling an object, the mat comprising: a first layer bonded to a second layer to define an interior space therebetween; a liquid activated cooling composition within the interior space; and a fill spout at a first end of the mat, the fill spout extending from the exterior of the mat to the interior space of the mat, allowing the addition of liquid to the interior space; the mat further comprising a support opening at the first end of the mat for receiving a support member for hanging the mat when adding liquid through the fill spout the support opening is an opening extending through the first layer and the second layer, wherein the support opening has a support perimeter including a support bond between the first and second layers.

2. The cooling mat of claim 1 wherein the first layer and the second layer comprise nylon coated polyvinylchloride (PVC).

3. The cooling mat of claim 1 wherein the first layer is bonded to the second layer about at least a portion of a common perimeter.

4. The cooling mat of claim 3 wherein the bond between the first and second layers is achieved with radiofrequency welding.

5. The cooling mat of claim 1 further comprising one or more intermediate bonds between the first layer and the second layer.

6. The cooling mat of claim 5 wherein the intermediate bonds are achieved with radiofrequency welding.

7. The cooling mat of claim 1 wherein the liquid activated cooling composition expands to hold liquid in gel form with the addition of a liquid.

8. The cooling mat of claim 1 wherein the cooling composition comprises a liquid activated super absorbant polymer in the form of powders, granules, beads, microcapsules, pellets and combinations thereof.

9. The cooling mat of claim 8 wherein the cooling composition comprises liquid activated super absorbant polymer beads.

10. The cooling mat of claim 1 wherein the fill spout comprises a seal selected from the group consisting of a resealable seal and a permanent seal.

11. The cooling mat of claim 1 wherein the fill spout is self-sealing.

12. The cooling mat of claim 1 wherein the support bond between the first and second layers are achieved with radiofrequency welding.

13. The cooling mat of claim 1 wherein the support opening is in the form of a handle extending from a perimeter of the mat.

* * * * *